(12) United States Patent
Budica et al.

(10) Patent No.: US 9,068,562 B1
(45) Date of Patent: Jun. 30, 2015

(54) LASER-POWERED PROPULSION SYSTEM

(71) Applicant: The Boeing Company, Chicago, IL (US)

(72) Inventors: Robert J. Budica, Laguna Hills, CA (US); James S. Herzberg, Long Beach, CA (US); Frank O. Chandler, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 13/645,816

(22) Filed: Oct. 5, 2012

(51) Int. Cl.
| | | |
|---|---|---|
| *B64G 1/40* | (2006.01) | |
| *F03H 1/00* | (2006.01) | |
| *G21B 1/01* | (2006.01) | |
| *G21B 1/03* | (2006.01) | |
| *G21B 1/15* | (2006.01) | |

(52) U.S. Cl.
CPC *F03H 1/00* (2013.01); *B64G 1/408* (2013.01); *G21B 1/01* (2013.01); *G21B 1/03* (2013.01); *G21B 1/15* (2013.01)

(58) Field of Classification Search
CPC ....... F03H 1/0093; F03H 1/00; F03H 1/0081; B64G 1/408; B64G 1/409; B64G 1/405; B64G 1/422; G21B 1/00; G21B 1/01; G21B 1/03; G21B 1/13; G21B 1/15
USPC ...................................... 60/200.1, 202, 203.1
See application file for complete search history.

(56) References Cited

U.S. PATENT DOCUMENTS

| 4,297,165 A | * | 10/1981 | Brueckner | .................... 376/103 |
| 4,328,070 A | * | 5/1982 | Friedwardt M. Winterberg | .................... 376/102 |
| 5,542,247 A | * | 8/1996 | Bushman | ..................... 60/203.1 |

OTHER PUBLICATIONS

Orth "VISTA—A Vehicle for Interplanetary Space Transport Application Powered by Inertial Confinement Fusion", May 16, 2003, pp. 8, 18, 32, 42.*
Clark "Plastic ablator ignition capsule design for the National Ignition Facility" Journal of Physics: Conference Series 244 (2010), pp. 1-2.*
Fan "Diode Pumped Solid State Lasers" vol. 3, No. 3, 1990 The Lincoln Laboratory Journal, pp. 413,416.*
Hooper "Laser Plasma Interactions 5: Inertial Confinement Fusion" 1995 Taylor Francis Group, pp. 71-72.*
NASA—National Aeronautics and Space Administration; Specific Impulse; Glen Research Center; "Propulsion Device"; Article Editor: Tom Benson (NASA Official); Last Updated Jul. 11, 2008.

* cited by examiner

*Primary Examiner* — Phutthiwat Wongwian
*Assistant Examiner* — William Breazeal

(57) ABSTRACT

A propulsion apparatus includes a propellant, at least one laser, and a thrust member. The propellant includes a solid surface having a hollow core disposed within the solid surface and a thrust-producing medium disposed within the hollow core. The at least one laser is positioned to vaporize the propellant with at least one laser-beam into a thrust-producing flow. The thrust member is for flowing within the thrust member a thrust-producing flow created by vaporization of the propellant.

29 Claims, 4 Drawing Sheets

LASER-POWERED PROPULSION SYSTEM

FIELD OF THE DISCLOSURE

This disclosure relates to a laser-powered propulsion system and method.

BACKGROUND

Electric propulsion has been considered for powering spacecraft and other vehicles because of its potentially high specific impulse which reduces the amount of propellant and therefore system weight for a mission. A high specific impulse, resulting from a high exhaust velocity, requires high power per unit thrust. Therefore, a trade needs to be made between specific impulse, propellant weight, and weight of the power source, whether it is solar photovoltaic, solar thermal, or nuclear. A critical part of electric thrust generation is the process efficiency that relates to both propellant and its power generation system weight. Specifically, this is the efficiency of converting electrical power into thrust by accelerating the propellant. The process is typically not very efficient due to a number of factors including: losses to ionization and/or dissociation that is not recoverable as thrust; high-temperature operation and related radiative losses; required heating of cathode, electron emitter, or accelerating electrodes in the case of different types of ion engines; and arc losses including resistive, radiative and thermal, amongst others. Because of these issues and particularly the efficiency and power system weight, electric propulsion has limited applications, even with its potential for extremely high specific impulse as compared to chemical systems. The current non-chemical thrusters technology includes electro-thermal with a specific impulse of 800 seconds, arc jets with a specific impulse of 900-1,200 seconds, MPD/MHD and Hall-Effect with a specific impulse range from 1,200-2,500 seconds, and electrostatic/ion thrusters from 1,000-25,000 seconds. Electric thrusters depend on electrical energy fed into the reaction mass resulting in lower exhaust velocity and specific impulse, and increased system power-to-thrust ratio.

A system and method for propulsion is needed to increase exhaust velocity, to increase specific impulse, and to decrease system power-to-thrust ratio.

SUMMARY

In one embodiment, a propulsion apparatus includes a propellant, at least one laser, and a thrust member. The propellant comprises a solid surface comprising a hollow core disposed within the solid surface and a thrust-producing medium disposed within the hollow core. The at least one laser is positioned to vaporize the propellant with at least one laser-beam into a thrust-producing flow. The thrust member is for flowing within the thrust member a thrust-producing flow created by vaporization of the propellant.

In another embodiment, a propulsion apparatus includes a propellant, a propellant feed member, at least one laser, and a thrust member. The propellant comprises a solid surface comprising a hollow core disposed within the solid surface and a thrust-producing medium disposed within the hollow core. The propellant feed member is for feeding the propellant to a laser focal-point. The at least one laser is positioned to vaporize the propellant at the laser focal-point, with at least one laser-beam, into a thrust-producing flow. The thrust member is for flowing within the thrust member a thrust-producing flow created by vaporization of the propellant. The thrust member comprises either a parabolic-shaped, nozzle, reflector member for reflecting a thrust-producing flow created by vaporization of the propellant, or the thrust member comprises a nozzle with at least one magnetic member disposed to magnetically direct, within the nozzle, a thrust-producing flow created by vaporization of the propellant.

In still another embodiment, a method of propulsion is disclosed. In one step, a propellant is vaporized with at least one laser-beam, produced by at least one laser, into a thrust-producing flow. The propellant comprises a solid surface, a hollow core disposed within the solid surface, and a thrust-producing medium disposed within the hollow core. In another step, the thrust-producing flow is flowed within a thrust member to provide propulsion.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
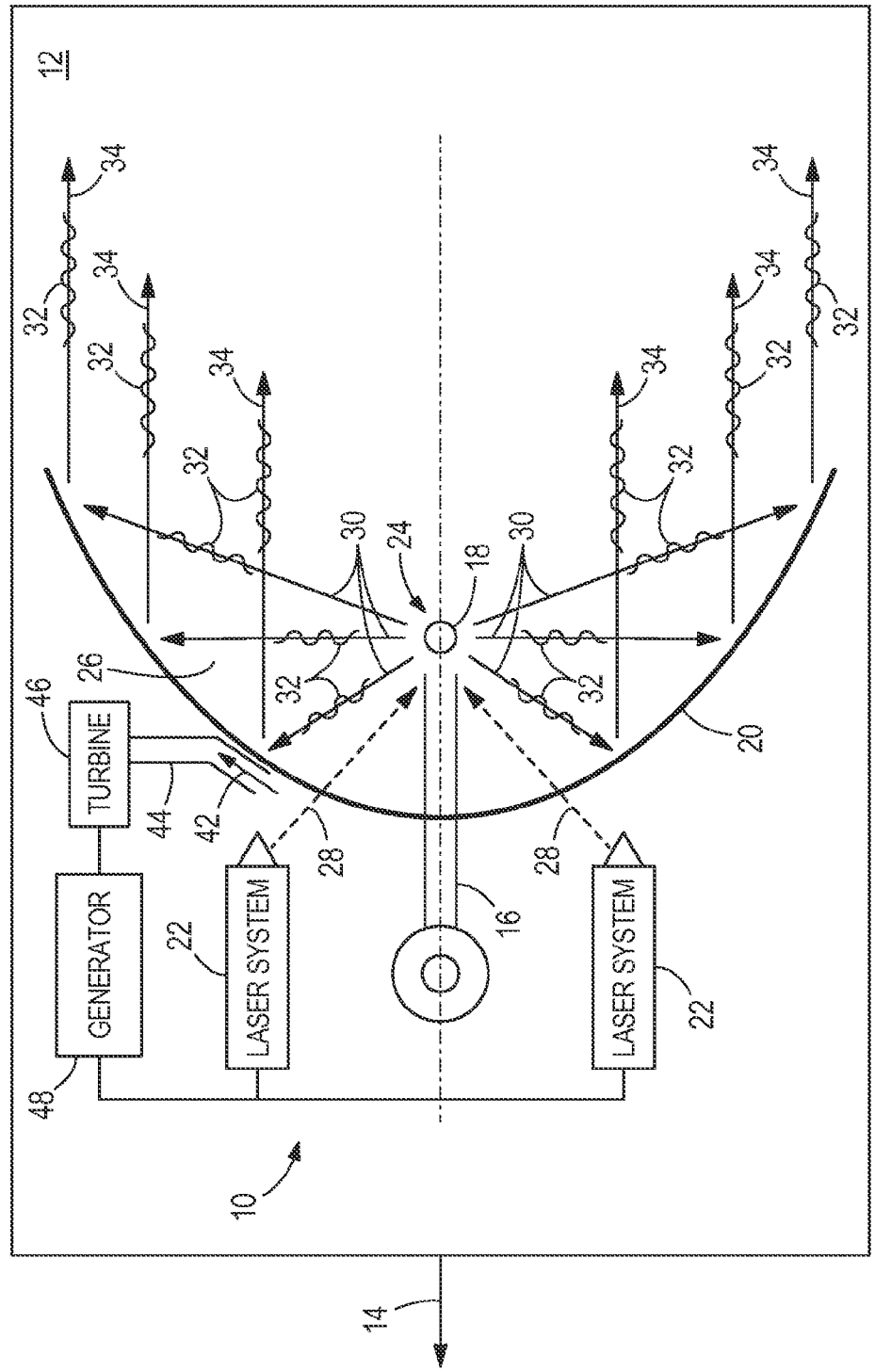
FIG. 1 illustrates a cross-section view through one embodiment of a propulsion apparatus of a vehicle.

FIG. 1 illustrates a cross-section view through one embodiment of a propulsion apparatus 10 of a vehicle 12. The propulsion apparatus 10 is used to propel the vehicle 12 in direction 14. The vehicle 12 may comprise a spacecraft, a rocket, an aircraft, a missile, or another type of propelled vehicle. The propulsion apparatus 10 comprises a propellant feed member 16, a propellant 18, a thrust member 20, and a laser system 22.

The propellant feed member 16 feeds the propellant 18 to a laser focal-point 24 within a cavity 26 of the thrust member 20. The propellant feed member 16 may comprise a propellant feed rod which extends through a hole 21 of the thrust member 20 into the cavity 26 of the thrust member 20 to feed the propellant 18 through the propellant feed member 16 to the laser focal-point 24. The propellant 18 comprises a medium, such as pellets or other substances, for providing the thrust to propel the vehicle 12 in direction 14. The laser system 22 comprises one or more lasers for vaporizing the propellant 18, when the propellant 18 is disposed at the laser focal-point 24, with one or more laser beams 28 emitted by the one or more lasers. Ideally, the laser system 22 is located so that the laser beams 28 contact the propellant 18 symmetrically so that the propellant 18 will vaporize and travel symmetrically in directions 30.

When the laser system 22 vaporizes the propellant 18 the resultant propellant exhaust gas referred to as the thrust-producing flow 32 travels in directions 30, is reflected off the thrust member 20, and then travels in direction 34 within the thrust member 20 providing thrust to propel the vehicle 12 in direction 14. The thrust member 20 comprises a parabolic-shaped, nozzle, reflector member. In other embodiments, the thrust member 20 may comprise varying shapes, sizes, orientations, or configurations, and the thrust-producing flow 32 may not come into contact with the thrust member 20.

Figure 2:
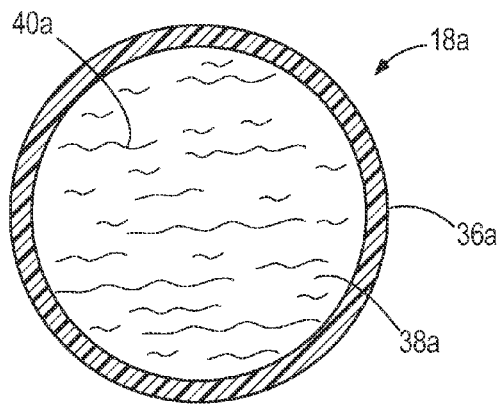
FIG. 2 illustrates a cross-section through one embodiment of a propellant which may be used in the embodiment of FIG. 1.

FIG. 2 illustrates a cross-section through one embodiment of a propellant 18a which may be used in the embodiment of FIG. 1. As shown in FIG. 2, the propellant 18a may comprise a solid surface 36a having a hollow core 38a containing a thrust-producing medium 40a. The solid surface 36a may comprise plastic, Teflon, or another type of surface which the laser system 22 of FIG. 1 can compress and vaporize. The thrust-producing medium 40a may comprise hydrogen gas, helium gas, or another type of gas or other medium which the solid surface 36a can compress and which the laser system 22 of FIG. 1 can vaporize, heat, or energize. When the propellant 18a of FIG. 2 is utilized in the embodiment of FIG. 1, the laser system 22 of FIG. 1 may comprise a set of Xenon flash lamp driven ruby lasers for providing pulsed laser beams to vaporize, using pulsed laser beams, pellets each comprising the propellant 18a of FIG. 2. Use of this embodiment reduces exhaust molecular weight, and increases exhaust velocity and specific impulse. In this embodiment, a specific impulse of 1,000-2,500 seconds may be provided. In other embodiments, the apparatus 10, propellant feed member 16, propellant 18, thrust member 20, and laser system 22 of FIG. 1 may be varied further to create differing specific impulses.

Figure 3:
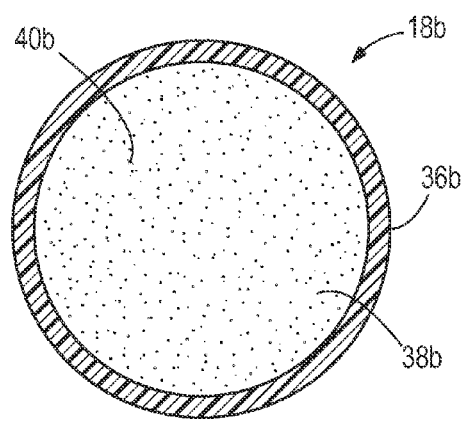
FIG. 3 illustrates a cross-section through another embodiment of a propellant which may be used in the embodiment of FIG. 1.

FIG. 3 illustrates a cross-section through another embodiment of a propellant 18b which may be used in the embodiment of FIG. 1. As shown in FIG. 3, the propellant 18b may comprise a solid surface 36b having a hollow core 38b containing a thrust-producing medium 40b. The solid surface 36b may comprise plastic, Teflon, or another type of surface which the laser system 22 of FIG. 1 can compress and vaporize. The thrust-producing medium 40b may comprise a mixture of Deuterium and Tritium (hydrogen-isotopes), nuclear material, or another type of gas or other medium which the solid surface 36b can compress and which the laser system 22 of FIG. 1 can vaporize, heat, or energize. When the propellant 18b of FIG. 3 is utilized in the embodiment of FIG. 1, the laser system 22 of FIG. 1 may comprise one or more Yttrium-Aluminum-Garnet (YAG) lasers with a light-emitting diode (LED) driven flash lamp for providing pulsed laser beams to vaporize, using pulsed laser beams, pellets each comprising the propellant 18b of FIG. 3.

As a result of the compression of the Deuterium and Tritium by ablation of the solid surface 36b, the gas mixture reaches sufficiently high temperatures to cause some Deuterium and Tritium fusion, and additional energy release (although not breakeven) which increases the plasma temperature, and therefore increases exhaust velocity and specific impulse and neutrons. In conjunction with this embodiment, the thrust member 20 of FIG. 1 may contain U-238 or another material which may undergo fast neutron fission and energy release, upon being contacted by some of the neutrons of the vaporized propellant 18b of FIG. 3, which may then be absorbed by coolant 42, flowing within a pipe 44, to power a turbine 46, which powers a power generator 48, which powers the laser system 22. Moreover, the coolant 42 carried by pipe 44 may be flowed through pores of the thrust member 20 to be heated into a gas, due to the vaporized propellant 18b of FIG. 3 and the reaction of the U-238 or another material, to produce additional thrust. In one embodiment, the coolant 42 may comprise hydrogen. In other embodiments, the coolant may comprise varying mediums. Use of this embodiment reduces exhaust molecular weight, and increases exhaust velocity and specific impulse. In this embodiment, a specific impulse of 2,000-5,000 seconds may be provided. In other embodiments, the apparatus 10, propellant feed member 16, propellant 18, thrust member 20, and laser system 22 of FIG. 1 may be varied further to create differing specific impulses.

Figure 4:
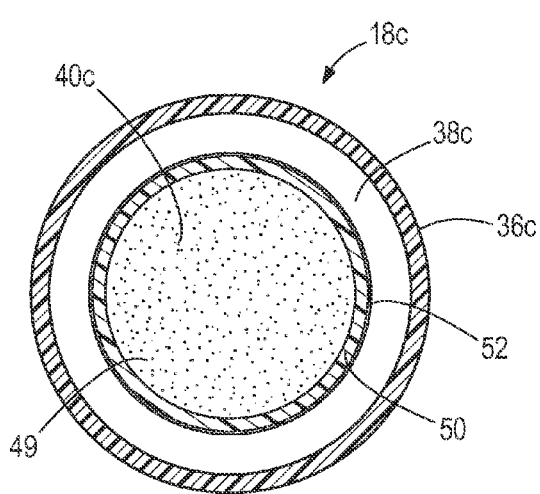
FIG. 4 illustrates a cross-section through another embodiment of a propellant which may be used in the embodiment of FIG. 1.

FIG. 4 illustrates a cross-section through another embodiment of a propellant 18c which may be used in the embodiment of FIG. 1. As shown in FIG. 4, the propellant 18c may comprise a solid surface 36c having a hollow core 38c, with a second solid surface 50 disposed within the hollow core 38c, and thrust-producing medium 40c disposed within a second hollow core 49 of the second solid surface 50. The solid surface 36c may comprise plastic, PTFE, or another type of surface which the laser system 22 of FIG. 1 can compress and vaporize. The second solid surface 50 may comprise Beryllium coated with a U-238 layer 52, or another type of material which may or may not be coated with varying materials. The thrust-producing medium 40c may comprise a mixture of Deuterium and Tritium (hydrogen-isotopes), nuclear material, or another type of gas or other medium which the solid surfaces 36c and 50 can compress and which the laser system 22 of FIG. 1 can vaporize, heat, or energize. When the propellant 18c of FIG. 4 is utilized in the embodiment of FIG. 1, the laser system 22 of FIG. 1 may comprise one or more light-emitting diode (LED) driven Alexandrite lasers for providing pulsed laser beams to vaporize, using pulsed laser beams, pellets each comprising the propellant 18c of FIG. 4.

As a result of the compression of the Deuterium and Tritium by ablation of the solid surfaces 36c and 50, the gas mixture reaches sufficiently high temperatures to cause some Deuterium and Tritium fusion, and additional energy release (although not breakeven) which increases the plasma temperature, and therefore increases exhaust velocity and specific impulse and neutrons. Moreover, the U-238 layer 52 may undergo fast neutron fission and energy release creating even more energy. In conjunction with this embodiment, the thrust member 20 of FIG. 1 may also contain U-238 or another material which may undergo fast neutron fission and energy release, upon being contacted by some of the neutrons of the vaporized propellant 18c of FIG. 4, which may then be absorbed by coolant 42, flowing within a pipe 44, to power a turbine 46, which powers a power generator 48, which powers the laser system 22. Moreover, the coolant 42 carried by pipe 44 may be flowed through pores of the thrust member 20 to be heated into a gas, due to the vaporized propellant 18c of FIG. 4 and the reaction of the U-238 or another material, to produce additional thrust. In one embodiment, the coolant 42 may comprise hydrogen. In other embodiments, the coolant may comprise varying mediums. Use of this embodiment reduces exhaust molecular weight, and increases exhaust velocity and specific impulse. In this embodiment, a specific impulse of 5,000-25,000 seconds may be provided. In other embodiments, the apparatus 10, propellant feed member 16, propellant 18, thrust member 20, and laser system 22 of FIG. 1 may be varied further to create differing specific impulses.

Alternatively, when the propellant 18c of FIG. 4 is utilized in the embodiment of FIG. 1, the laser system 22 of FIG. 1 may comprise one or more free-electron lasers for providing pulsed laser beams to vaporize, using pulsed laser beams, pellets each comprising the propellant 18c of FIG. 4. As a result of the compression of the Deuterium and Tritium by ablation of the solid surfaces 36c and 50 with the free-electron lasers, the gas mixture reaches sufficiently high temperatures to cause a release of energy, alpha particles and neutrons which causes additional neutrons to be released by the Beryllium layer 50 which causes some of the U-238 layer 52, which is fissionable by 'fast' rather than 'thermal' neutrons, to fission, release significant energy, and explode. The secondary explosion recompresses more of the Deuterium and Tritium, causing more fusion energy to be released beyond the 'breakeven' level vaporizing the remaining pellet materials of the propellant 18c and increasing the overall thrust and exhaust velocity.

In conjunction with this embodiment, the thrust member 20 of FIG. 1 may also contain U-238 or another material which may undergo fast neutron fission and energy release, upon being contacted by some of the neutrons of the vaporized propellant 18c of FIG. 4, which may then be absorbed by coolant 42, flowing within pipe 44, to power turbine 46, which powers power generator 48, which powers the laser system 22. Moreover, the coolant 42 carried by pipe 44 may be flowed through pores of the thrust member 20 to be heated into a gas, due to the vaporized propellant 18c of FIG. 4 and the reaction of the U-238 or another material, to produce additional thrust. In one embodiment, the coolant 42 may comprise hydrogen. In other embodiments, the coolant may comprise varying mediums. Use of this embodiment reduces exhaust molecular weight, and increases exhaust velocity and specific impulse. In this embodiment, a specific impulse of 100,000-250,000 seconds may be provided. In other embodiments, the apparatus 10, propellant feed member 16, propellant 18, thrust member 20, and laser system 22 of FIG. 1 may be varied further to create differing specific impulses.

Figure 5:
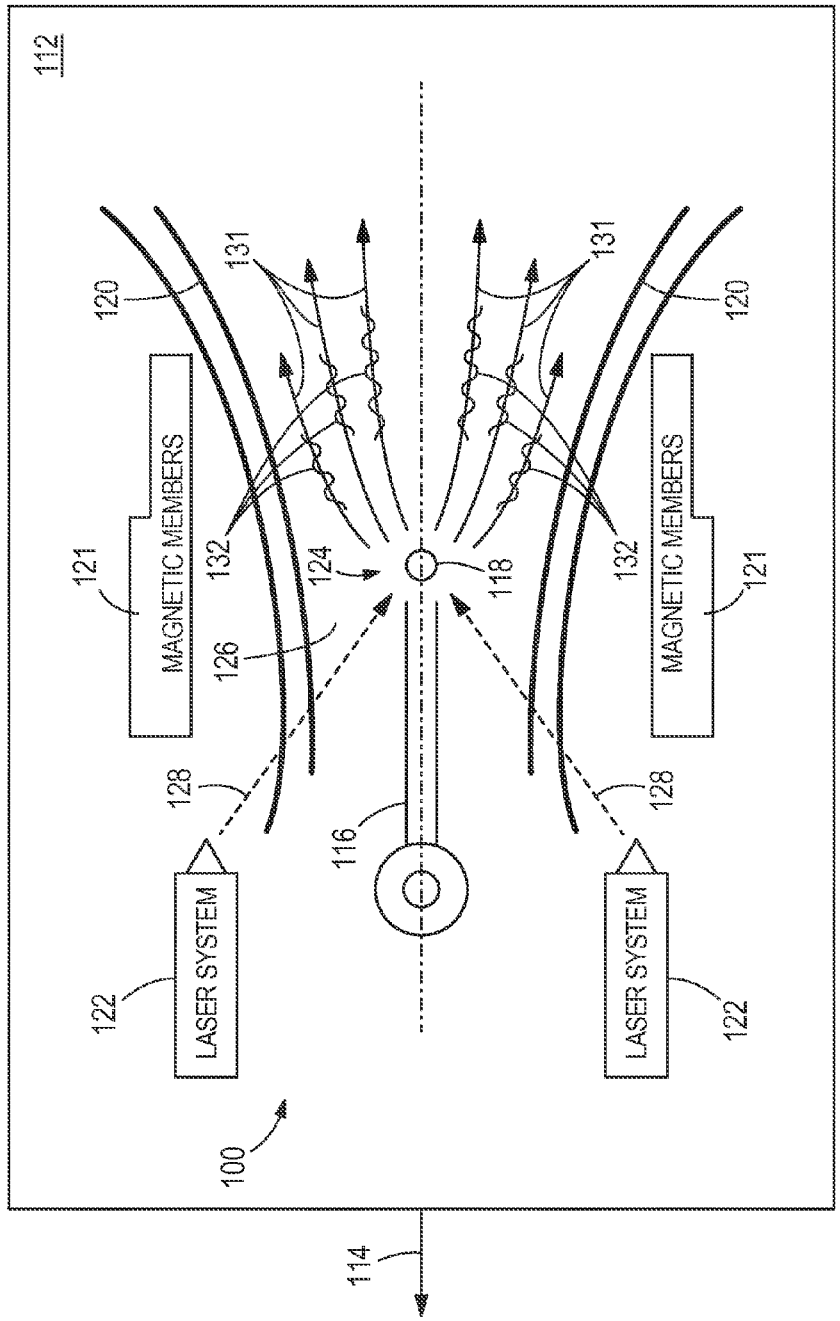
FIG. 5 illustrates a cross-section view through another embodiment of a propulsion apparatus of a vehicle.

FIG. 5 illustrates a cross-section view through another embodiment of a propulsion apparatus 100 of a vehicle 112. The propulsion apparatus 100 is used to propel the vehicle 112 in direction 114. The vehicle 112 may comprise a spacecraft, a rocket, an aircraft, a missile, or another type of propelled vehicle. The propulsion apparatus 100 comprises a propellant feed member 116, a propellant 118, a thrust member 120, magnetic members 121, and a laser system 122.

The propellant feed member 116 feeds the propellant 118 to a laser focal-point 124 within a cavity 126 of the thrust member 120. The propellant feed member 116 may comprise a propellant feed rod which feeds the propellant 118 through the propellant feed rod to the laser focal-point 124. The propellant 118 comprises a medium, such as pellets or other substances, for providing the thrust to propel the vehicle 112 in direction 114. The laser system 122 comprises one or more lasers for vaporizing the propellant 118, when the propellant 118 is disposed at the laser focal-point 124, with one or more laser beams 128 emitted by the one or more lasers. Ideally, the laser system 122 is located so that the laser beams 128 contact the propellant 118 symmetrically so that the propellant 118 will vaporize and travel symmetrically in directions 131.

When the laser system 122 vaporizes the propellant 118 the resultant propellant exhaust gas referred to as the thrust-producing flow 132 travels in directions 131 and out of the thrust member 120 without contacting the thrust member 120 due to magnetic members 121 directing, due to magnetism, the thrust-producing flow 132 in directions 131 to provide thrust to propel the vehicle 112 in direction 114. The thrust member 120 comprises a nozzle. In other embodiments, the thrust member 120 may comprise varying shapes, sizes, orientations, or configurations.

In one embodiment, the propellant 118 of FIG. 5 may comprise the embodiment of FIG. 4 with the laser system 122 of FIG. 5 comprising one or more light-emitting diode (LED) driven Alexandrite lasers for providing pulsed laser beams to vaporize, using pulsed laser beams, pellets each comprising the propellant 18c of FIG. 4. As a result of the compression of the Deuterium and Tritium of FIG. 4 by ablation of the solid surfaces 36c and 50, the gas mixture reaches sufficiently high temperatures to cause some Deuterium and Tritium fusion, and additional energy release (although not breakeven) which increases the plasma temperature, and therefore increases exhaust velocity and specific impulse and neutrons. Moreover, the U-238 layer 52 of FIG. 4 may undergo fast neutron fission and energy release creating even more energy. Use of this embodiment reduces exhaust molecular weight, and increases exhaust velocity and specific impulse. In this embodiment, a specific impulse of 5,000-25,000 seconds may be provided. In other embodiments, the apparatus 100, propellant feed member 116, propellant 118, thrust member 120, magnetic members 121, and laser system 122 of FIG. 5 may be varied further to create differing specific impulses.

In another embodiment, the propellant 118 of FIG. 5 may comprise the embodiment of FIG. 4 with the laser system 122 of FIG. 5 comprising one or more free-electron lasers for providing pulsed laser beams to vaporize, using pulsed laser beams, pellets each comprising the propellant 18c of FIG. 4. As a result of the compression of the Deuterium and Tritium of FIG. 4 by ablation of the solid surfaces 36c and 50 with the free-electron lasers, the gas mixture reaches sufficiently high temperatures to cause a release of energy, alpha particles and neutrons which causes additional neutrons to be released by the Beryllium layer 50 which causes some of the U-238 layer 52, which is fissionable by 'fast' rather than 'thermal' neutrons, to fission, release significant energy, and explode. The secondary explosion recompresses more of the Deuterium and Tritium, causing more fusion energy to be released beyond the 'breakeven' level vaporizing the remaining pellet materials of the propellant 18c of FIG. 4 and increasing the overall thrust and exhaust velocity. Use of this embodiment reduces exhaust molecular weight, and increases exhaust velocity and specific impulse. In this embodiment, a specific impulse of 100,000-250,000 seconds may be provided. In other embodiments, the apparatus 100, propellant feed member 116, propellant 118, thrust member 120, magnetic members 121, and laser system 122 of FIG. 5 may be varied further to create differing specific impulses.

Figure 6:
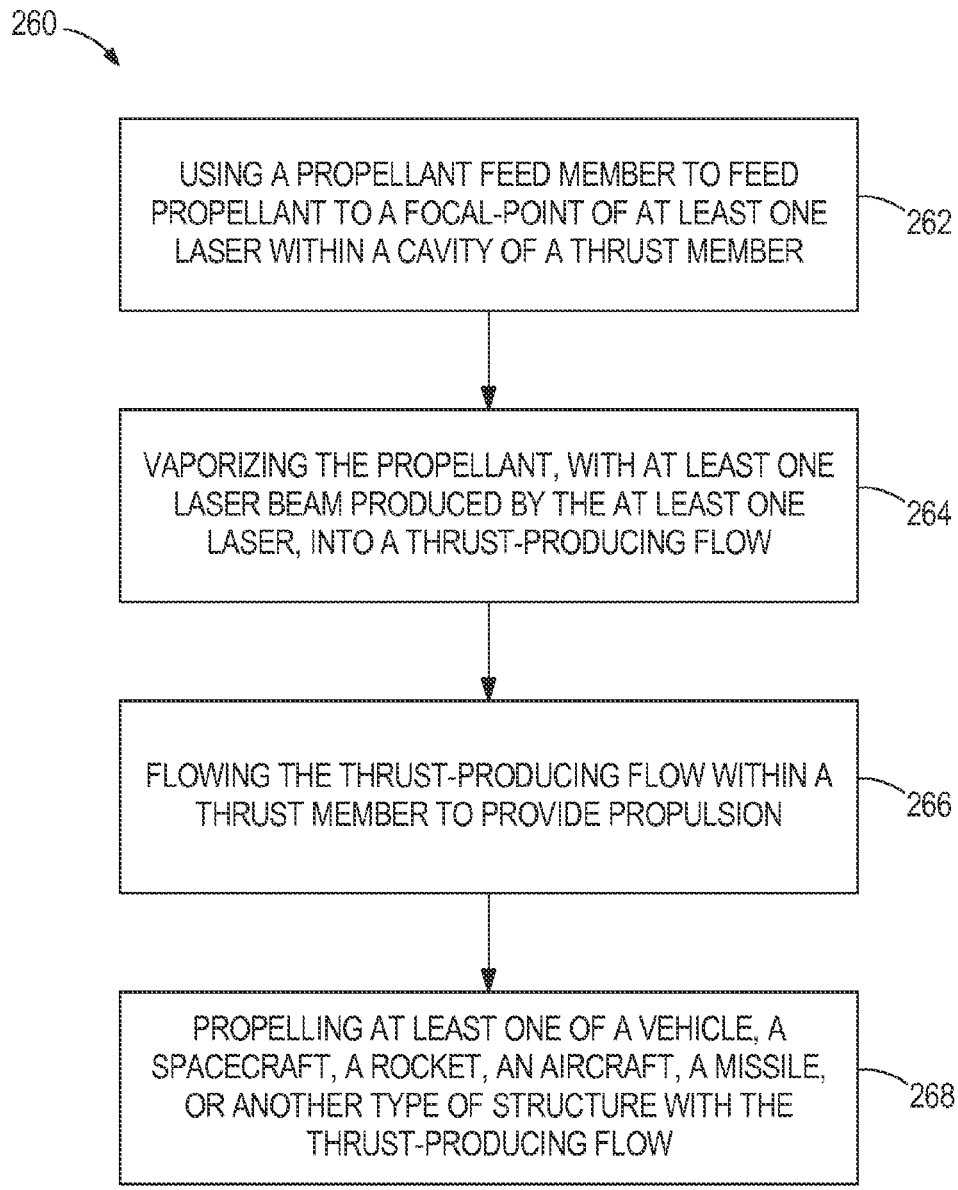
FIG. 6 illustrates a flowchart of one embodiment of a method of propulsion.

FIG. 6 illustrates a flowchart of one embodiment of a method 260 of propulsion. The method 260 may utilize any of the embodiments disclosed in this disclosure. In step 262, a propellant feed member feeds propellant to a focal-point of at least one laser within a cavity of a thrust member. The propellant feed member, propellant, at least one laser, and thrust member may comprise any of the embodiments disclosed in this disclosure. In step 264, the propellant is vaporized, with at least one laser beam produced by the at least one laser, into a thrust-producing flow. In step 266, the thrust-producing flow is flowed within the thrust member to provide propulsion. In one embodiment, the thrust-producing flow may be reflected off the thrust member. In another embodiment, the thrust-producing flow may contact the thrust member causing U-238 or another material of the thrust member to undergo fast neutron fission and energy release which is absorbed by coolant disposed within a pipe with the coolant powering a turbine which powers a power generator which powers the at least one laser. In still another embodiment, coolant carried by a pipe may be flowed through pores of the thrust member and heated into a gas, due to the vaporized propellant and the reaction of U-238 or another material, to produce additional thrust. The coolant may comprise any of the embodiments disclosed in this disclosure. In yet another embodiment, at least one magnetic member may magnetically direct the thrust-producing flow within the nozzle. In step 268, at least one of a vehicle, a spacecraft, a rocket, an aircraft, a missile, or another type of structure is propelled with the thrust-producing flow. In other embodiments, one or more steps of the method 260 may be modified, not followed, changed in order, or one or more additional steps may be added.

One or more embodiments of the disclosure may reduce one or more issues of one or more of the current systems and methods for propulsion by extracting energy from nuclear fusion and combined fusion-fission nuclear reactions thus significantly increasing exhaust velocity and specific impulse and significantly decreasing system power-to-thrust ratio.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A propulsion apparatus comprising:
a propellant comprising: a solid surface comprising a hollow core disposed within the solid surface and a thrust-producing medium disposed within the hollow core;
a thrust member comprising a cavity;
at least one laser positioned to vaporize the propellant with at least one laser-beam into a thrust-producing flow within the cavity; and
a portion of the thrust member which bounds the cavity, the portion of the thrust member configured to reflect the thrust-producing flow created by vaporization of the propellant, the portion of the thrust member containing a material which undergoes fast neutron fission and energy release upon being contacted by fast neutrons from the propellant.

2. The propulsion apparatus of claim 1 wherein the thrust-producing medium comprises a gas.

3. The propulsion apparatus of claim 1 wherein the thrust-producing medium comprises a hydrogen gas or a helium gas.

4. The propulsion apparatus of claim 1 wherein the thrust-producing medium comprises Deuterium and Tritium.

5. The propulsion apparatus of claim 1 wherein the solid surface comprises plastic.

6. The propulsion apparatus of claim 1 wherein the propellant comprises a second solid surface disposed within the hollow core of the solid surface, and the thrust-producing medium is disposed within a second hollow core of the second solid surface.

7. The propulsion apparatus of claim 6 wherein the solid surface comprises plastic, the second solid surface comprises Beryllium, and the thrust-producing medium comprises Deuterium and Tritium.

8. The propulsion apparatus of claim 7 wherein the second solid surface further comprises a U-238 coating.

9. The propulsion apparatus of claim 1 wherein the at least one laser comprises at least one of a Xenon flash lamp driven ruby laser, a Yttrium-Aluminum-Garnet laser with a light-emitting diode driven flash lamp, a light-emitting-diode driven Alexandrite laser, or a free electron laser.

10. The propulsion apparatus of claim 1 wherein the thrust-member comprises a parabolic-shaped nozzle.

11. The propulsion apparatus of claim 1 wherein the thrust member further includes at least one magnetic member for magnetically directing the thrust-producing flow.

12. The propulsion apparatus of claim 1 wherein the material is U-238.

13. The propulsion apparatus of claim 1 further comprising at least one system for powering the at least one laser using the material which undergoes fast neutron fission and energy release upon being contacted by the fast neutrons from the propellant.

14. The propulsion apparatus of claim 13 wherein the at least one system comprises coolant, a turbine, and a power generator connected to the at least one laser.

15. An aircraft laser propulsion system comprising:
an aircraft comprising:
a propellant having a solid surface comprising a hollow core disposed within the solid surface and a thrust-producing medium disposed within the hollow core;
a thrust member comprising a cavity;
a laser having a laser beam positioned to vaporize the propellant into a thrust-producing flow within the cavity; and
a portion of the thrust member which bounds the cavity, the portion of the thrust member configured to reflect the thrust-producing flow created by vaporization of the propellant, the portion of the thrust member containing a material which undergoes fast neutron fission and energy release upon being contacted by fast neutrons from the propellant.

16. A method of propulsion comprising:
vaporizing a propellant with at least one laser-beam, produced by at least one laser, into a thrust-producing flow within a cavity of a thrust member, the propellant comprising a solid surface, a hollow core disposed within the solid surface, and a thrust-producing medium disposed within the hollow core;
reflecting the thrust-producing flow, created by vaporization of the propellant, off a portion of the thrust member which bounds the cavity to provide propulsion; and
contacting a material contained within the portion of the thrust member by fast neutrons from the propellant to cause the material to undergo fast neutron fission and energy release.

17. The method of claim 16 wherein the thrust-producing medium comprises a gas.

18. The method of claim 16 wherein the thrust-producing medium comprises a hydrogen gas or a helium gas.

19. The method of claim 16 wherein the thrust-producing medium comprises Deuterium and Tritium.

20. The method of claim 16 wherein the solid surface comprises plastic.

21. The method of claim 16 wherein the propellant comprises a second solid surface disposed within the hollow core of the solid surface, and the thrust-producing medium is disposed within a second hollow core of the second solid surface.

22. The method of claim 21 wherein the solid surface comprises plastic, the second solid surface comprises Beryllium, and the thrust-producing medium comprises Deuterium and Tritium.

23. The method of claim 22 wherein the second solid surface further comprises a U-238 coating.

24. The method of claim 16 wherein the at least one laser comprises at least one of a Xenon flash lamp driven ruby laser, a Yttrium-Aluminum-Garnet laser with a light-emitting diode driven flash lamp, a light-emitting-diode driven Alexandrite laser, or a free electron laser.

25. The method of claim 16 wherein the thrust member comprises a parabolic-shaped nozzle.

26. The method of claim 16 further comprising feeding the propellant, with a propellant feed member, to a focal-point of the at least one laser within the cavity of the thrust member.

27. The method of claim 16 wherein the material is U-238.

28. The method of claim 16 further comprising powering the at least one laser with at least one system using the material undergoing the fast neutron fission and energy release upon being contacted by the fast neutrons from the propellant.

29. The method of claim 28 wherein the at least one system comprises coolant, a turbine, and a power generator connected to the at least one laser.

* * * * *